United States Patent

Yamamoto

Patent Number: 5,686,711
Date of Patent: Nov. 11, 1997

[54] SEMICONDUCTOR ACCELERATION SENSOR

[75] Inventor: Masahiro Yamamoto, Tokyo, Japan

[73] Assignee: Mitsubishi Denki Kabushiki Kaisha, Tokyo, Japan

[21] Appl. No.: 591,730

[22] Filed: Jan. 25, 1996

[30] Foreign Application Priority Data

Apr. 26, 1995 [JP] Japan ................................. 7-102689

[51] Int. Cl.⁶ .......................... G01P 15/00; H01H 35/14; H01L 29/84
[52] U.S. Cl. ............................... 200/61.48; 73/514.16; 73/514.21; 73/514.36
[58] Field of Search ............... 200/61.45 R, 61.45 M, 200/61.48–61.51; 257/414–420; 73/514.01–514.38, 1.37–1.39

[56] References Cited

U.S. PATENT DOCUMENTS

| | | | |
|---|---|---|---|
| 3,727,209 | 4/1973 | White et al. | 200/61.49 X |
| 5,058,960 | 10/1991 | Eccleston et al. | 73/514.36 |
| 5,081,867 | 1/1992 | Yamada | 73/514.38 X |
| 5,231,879 | 8/1993 | Yamamoto | 73/514.36 X |
| 5,265,473 | 11/1993 | Funabashi | 73/514.15 |
| 5,379,640 | 1/1995 | Yamamoto | 73/514.36 |
| 5,410,915 | 5/1995 | Yamamoto | 73/514.32 |
| 5,415,044 | 5/1995 | Yamamoto | 73/514.36 X |
| 5,460,044 | 10/1995 | Yamamoto | 73/514.16 |

Primary Examiner—J. R. Scott
Attorney, Agent, or Firm—Leydig, Voit & Mayer, Ltd.

[57] ABSTRACT

A highly reliable semiconductor acceleration sensor in which the amplification of the oscillation of the cantilever beam does not become large and break the beam. The semiconductor acceleration sensor has a beam support provided on a circuit substrate and a flexible acceleration detection beam deflecting according with the applied acceleration. An adhesive is disposed between the beam support and the acceleration detection beam. The semiconductor acceleration sensor has a sensor element for converting the deflection of the acceleration detection beam into an electrical signal. The natural oscillation frequency of the support section, formed by the adhesive and a root section of the beam which is fixed to the adhesive and the resonance frequency of the acceleration detection beam section extending from the root section do not overlap.

4 Claims, 3 Drawing Sheets

5,686,711

SEMICONDUCTOR ACCELERATION SENSOR

BACKGROUND OF THE INVENTION

1. Field of the Invention

The present invention relates to a semiconductor acceleration sensor employed in automobile ABS, air bag systems, or the like.

2. Description of the Related Art

FIG. 5 is a side sectional view of a conventional semiconductor acceleration sensor. FIG. 6 is a graph showing frequency characteristic curves of a conventional semiconductor acceleration sensor. A thick film resistance substrate 6 shaped into a thin plate is fixed onto a plate-shaped base 9 made of metal such as PCT. A plurality of lead pins 10 are perpendicular to and disposed around the thick film resistance substrate 6 and penetrate through the base 9 for the purpose of transmitting an electrical signal outside the sensor. The lead pins 10 are electrically insulated from the base 9 by a glass member.

A rectangular beam support 5 is fixed on the thick film resistance substrate 6 by a first adhesive 8a. A root section 3a of the thin-plate shaped acceleration detection beam 3 is bonded onto the beam support 5 by a second adhesive 8b and supported in a cantilever manner. Gold silicide (AuSi) is used for the first and second adhesives. A support section 20 is formed by the root section 3a, whose bottom face is fixed by the second adhesive onto the beam support 5 for the acceleration detection beam 3, and the second adhesive 8b. The portion protruding as a beam from the root section 3a of the acceleration detection beam 3 forms a beam section 3b.

A cap 12 is provided on the base 9 such that it covers the thick film resistance substrate 6 on the base 9 and electronic components on the thick film resistance substrate 6. The cover edges are fixed around the base 9 by projection welding.

A gage resistance 1 is formed at about the center of the top face of the acceleration detection beam 3. The gage resistance is a sensor element for converting the beam deflection into an electrical signal by the semiconductor piezoresistance effect. The gage resistance 1 is connected to circuit (not illustrated) by wires 2 formed by diffusion or the like on the acceleration detection beam 3. An amplification circuit (not illustrated) is also formed on the acceleration detection beam 3 for the purpose of amplifying an electrical signal from the bridge circuit. Gold (Au) wires 7 are provided between the acceleration detection beam 3 and the thick film resistance substrate 7 for transmitting the electrical signal from the amplification circuit. Further, a compensation circuit (not illustrated) is formed on the aforementioned thick film resistance substrate 6 for compensating a temperature characteristic of the amplified electrical signal from the bridge circuit. An Au wire 11 is provided between the thick film resistance substrate 6 and the lead pins 10 for transmitting the electrical signal coming from the thick film resistance substrate 6 to the lead pins 10. The face of the acceleration detection beam 3 opposite the gage resistance, is thin and forms a diaphragm 4.

FIG. 6 is a graph showing frequency characteristic curves of a conventional semiconductor acceleration sensor. The horizontal axis shows the frequency, while the vertical axis shows the sensitivity. The dot-dash chain line indicates the resonant frequency characteristic, fnb, of the beam section 3b, with the sensitivity being high at approximately 10 kHz. The dashed line indicates a natural oscillation frequency characteristic, fnd, of the support section 20, with the sensitivity being high at approximately 10 kHz. The solid line indicates the combined frequency characteristic of the resonance frequency characteristic, fnb, of the beam section 3b and the natural oscillation frequency characteristic, fnd, of the support section 20, with the sensitivity being quite high at approximately 10 kHz.

In a conventional semiconductor acceleration sensor having such a construction, however, since the resonant frequency region of the beam section 3b and the natural oscillation frequency region of the support section 20 overlap each other, when the acceleration frequency component applied to the semiconductor acceleration sensor contains many of the combined enlarged portion frequency region components, the support section 20 and the beam section 3b resonate, so that the amplification of the oscillation of the beam section 3b is increased, thereby breaking the beam section 3b. More specifically, the thin diaphragm of the beam section 3b is broken by shearing.

SUMMARY OF THE INVENTION

To overcome the above-described problem, an object of the present invention is to provide a highly reliable semiconductor acceleration sensor in which amplification of the oscillation of the cantilever beam will not become large and break the cantilever beam.

To this end, in one aspect of the present invention, there is provided a semiconductor acceleration sensor comprising a circuit substrate, a beam support provided on the circuit substrate, a flexible acceleration detection beam which deflects in accordance with the acceleration, an adhesive layer formed between the beam support and the acceleration detection beam, and a sensor element provided on the acceleration detection beam for converting the deflection amount of the acceleration detection beam to an electrical signal, wherein the natural oscillation frequency region of the support section, formed by the adhesive layer and a root section which is fixed to the adhesive layer for the acceleration detection beam, and the resonance frequency region of the beam section extending from the root section do not overlap.

In one form of the semiconductor acceleration sensor of the present invention, the adhesive may be selected so as to prevent overlap of the natural oscillation frequency region of the support section and the resonance frequency region of the beam section.

In one form of the semiconductor acceleration sensor of the present invention, the adhesive may be epoxy type resin. In one form of the semiconductor acceleration sensor of the present invention, the thickness of the adhesive layer may be selected so as to prevent overlap of the natural oscillation frequency region and the resonance frequency region of the beam section.

In the aforementioned one aspect of the semiconductor acceleration sensor of the present invention, the support section has a natural oscillation frequency region which does not overlap the resonance frequency of the beam section, so that the beam section does not resonate with the support section.

In the aforementioned one form of the semiconductor acceleration sensor of the present invention, when the adhesive for the support section is selected, the support section has a natural oscillation frequency region which does not overlap with the resonance frequency region of the beam section.

In the aforementioned one form of the semiconductor acceleration sensor of the present invention, when the adhesive for the support section is epoxy type resin, the support section has a natural oscillation frequency which does not overlap the resonance frequency of the beam section.

In the aforementioned one form of the semiconductor acceleration sensor of the present invention, when the thickness of the adhesive layer for the support section is selected, the support section has a natural oscillation frequency region which does not overlap the resonance frequency region of the beam section.

DESCRIPTION OF A PREFERRED EMBODIMENT

First Embodiment

Figure 1:
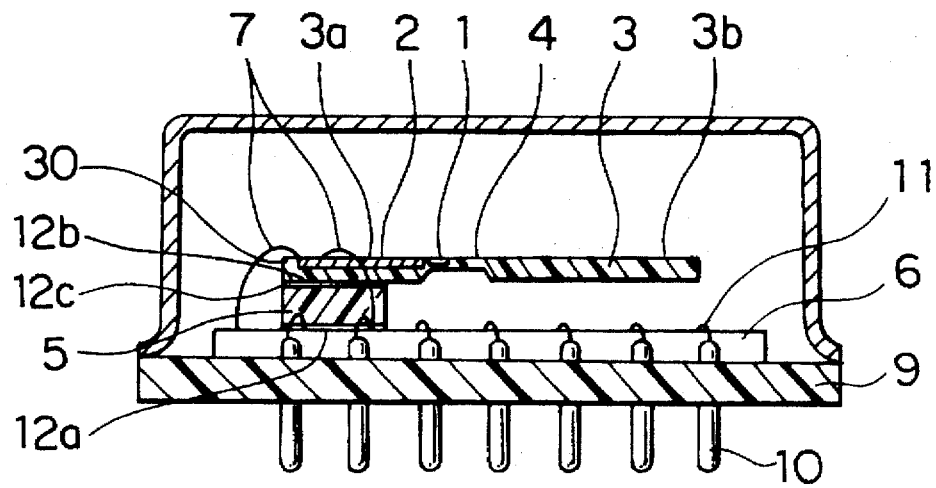
FIG. 1 is a side sectional view of a semiconductor acceleration sensor of an embodiment of the present invention.
Figure 2:
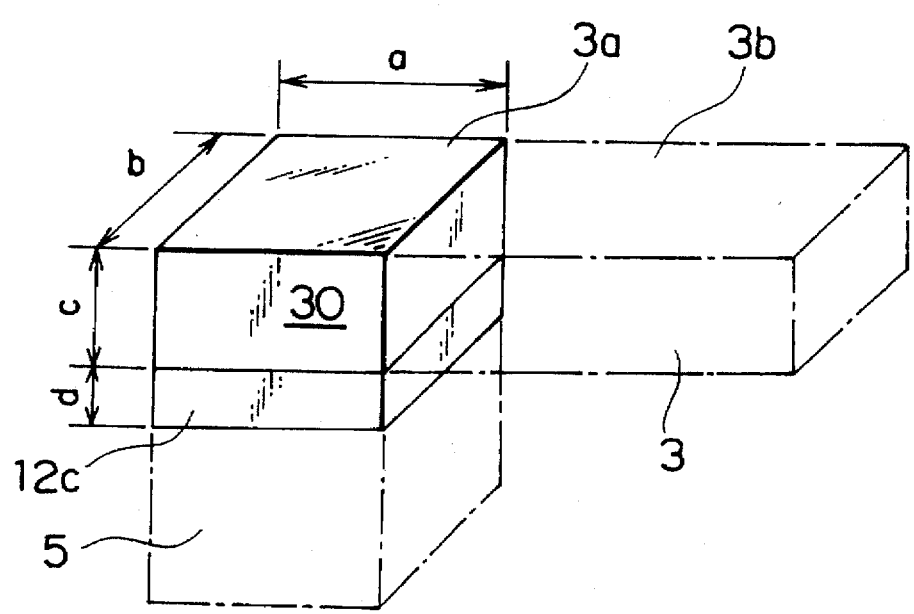
FIG. 2 is a perspective view of a form of a support section.
Figure 3:
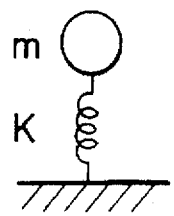
FIG. 3 is a model illustrating natural oscillation.
Figure 4:
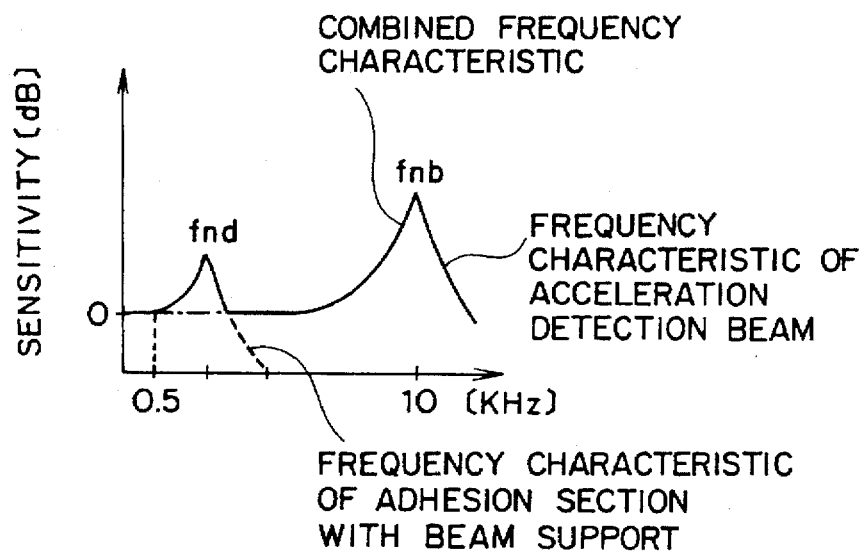
FIG. 4 is a graph showing frequency characteristic curves of a semiconductor acceleration sensor of the present invention.
Figure 5:
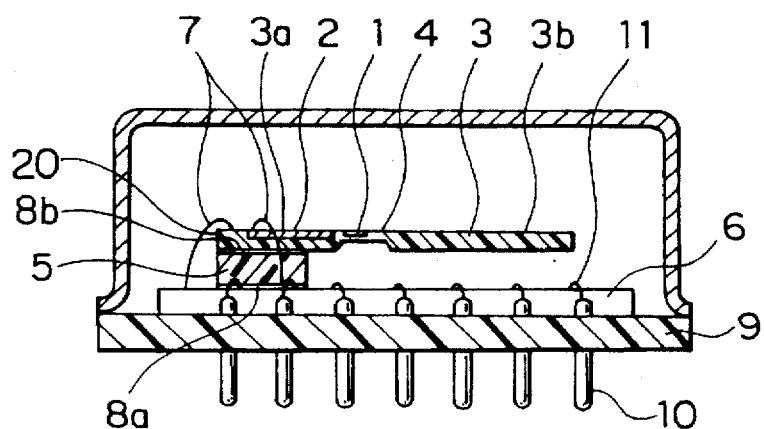
FIG. 5 is a side sectional view of a conventional semiconductor acceleration sensor.
Figure 6:
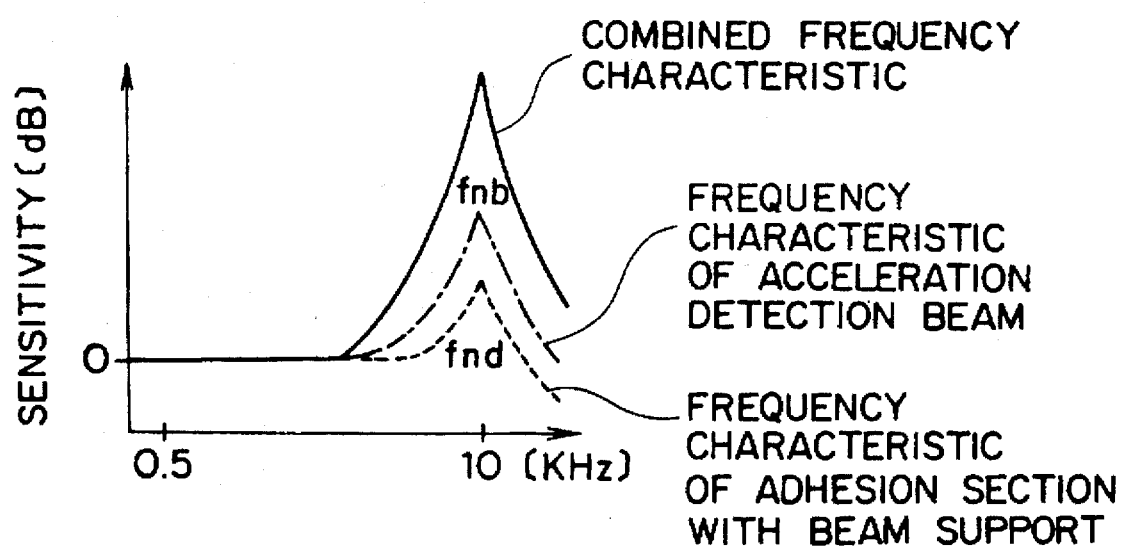
FIG. 6 is a graph showing frequency characteristic curves of the conventional semiconductor acceleration sensor.

FIG. 1 is a side sectional view of a semiconductor acceleration sensor of an embodiment of the present invention. FIG. 2 is a perspective view of a form of a support section. FIG. 3 is a model illustrating natural oscillation. FIG. 4 is a graph showing frequency characteristic curves of a semiconductor acceleration sensor of the present invention. Referring to FIG. 1, the rectangular beam support 5 is fixed onto the thick film resistance substrate. 6 by the first adhesive 12a. The thin-plate and rod shaped acceleration detection beam 3 has its root section 3a fixed onto the beam support 5 by the second adhesive 12b and is supported in a cantilever manner. Epoxy type resin having a lower Young's modulus than gold silicide (AuSi) is used for both the first and second adhesive. The support section 30 is formed by the root section 3a, whose bottom face is fixed by the second adhesive on the beam support 5 for the acceleration detection beam 3a, and the adhesive layer 12c formed by the second adhesive 12b. Other details of the construction are the same as those of the prior art.

The mechanical resonance frequency of the beam section 3b is approximately 10 kHz. A natural oscillation frequency, fn, of the support section 30 can be determined in the following way. It is assumed, as shown in FIG. 2, that the root section 3a is disposed above the second adhesive layer 12c. This may be replaced by a one degree-of-freedom type model, illustrated in FIG. 3, in which a body of mass m is supported by a spring having a spring constant k. The natural oscillation frequency of a one degree-of-freedom type model is expressed by formula (1):

$$fn = (1/(2\pi)) \cdot (k/m)^{1/2} \quad (1)$$

When the length of the root section 3a is defined as a, its width as b, its height as c, and its density as p, the mass m of the root section 3a is determined by formula (2):

$$m = p \cdot a \cdot b \cdot c \quad (2)$$

Stress s experienced by the second adhesive layer 12c is determined by formula (3):

$$s = (p \cdot a \cdot b \cdot c)/(a \cdot b) = p \cdot c \quad (3)$$

Strain e of the second adhesive layer 12c is determined by formula (4), when Young's modulus E of the second adhesive 12b is defined as E:

$$i \ e = s/E = (p \cdot c)/E \quad (4)$$

When the thickness of the second adhesive layer 12c is defined as d, the amount of strain Δ1 of the second adhesive layer is determined by formula (5):

$$\Delta 1 = d \cdot e = (p \cdot c \cdot d)/E \quad (5)$$

When the acceleration due to gravity is expressed as g and the force of the spring expressed as F, the spring constant k is determined by formula (6):

$$\begin{aligned} k &= F/\Delta 1 \\ &= (p \cdot a \cdot b \cdot c \cdot g)/((p \cdot c \cdot d)/E) \\ &= (a \cdot b \cdot E \cdot g)/d \end{aligned} \quad (6)$$

From formula (1), the following formula (7) for determining the natural oscillation frequency fn is derived:

$$\begin{aligned} fn &= (1/(2\pi)) \cdot (k/m)^{1/2} \\ &= (1/(2\pi)) \cdot ((a \cdot b \cdot E \cdot g)/(p \cdot a \cdot b \cdot c \cdot d))^{1/2} \\ &= (1/(2\pi)) \cdot ((E \cdot g)/(p \cdot c \cdot d))^{1/2} \end{aligned} \quad (7)$$

In this case, the thickness, c, of the root section 3a is $2.0 \times 10^{-4}$ m, the thickness, d, of the second adhesive is $5.0 \times 10^{-6}$ m, Young's modulus of the epoxy resin of the second adhesive is $5.4 \times 10^8$ kg/m$^2$, and the density of silicon used as material for the root section 3a is $1.54 \times 10^{10}$ kg/m$^3$, so that:

fn=2.95 kHz

In the prior art, gold silicide is used for the second adhesive, which has a Young's modulus of $6.32 \times 10^9$ kg/m$^2$, so that the natural oscillation frequency, fn, is:

fn=10.09 kHz

Since the mechanical resonance frequency of the beam section 3b is close to approximately 10 kHz, the natural oscillation frequency region of the support section 20 and the resonance frequency region of the beam section 3b overlap each other, which causes the support section 20 and the beam section 3b to resonate, so that the amplification of the oscillation of the beam section 3b becomes large and breaks the beam section 3b. In the present invention, since the natural oscillation frequency of the support section 30 is less than ½ of the mechanical resonance frequency of the beam section 3b, the natural oscillation frequency region of the support section 30 and resonance frequency region of the beam section 3b do not overlap, so that they will not resonate.

FIG. 4 is a graph showing frequency characteristic curves of the semiconductor acceleration sensor of the present invention. In the figure, the dot-dash line indicates the frequency characteristic of the beam section 3b, with the sensitivity being high at around 10 kHz. The dashed line indicates the frequency characteristic of the beam support section 13, with the sensitivity being high at around 3 kHz. The solid line indicates the combined frequency characteristic, and its maximum sensitivity does not become greater than each of the other sensitivities taken alone.

Using suitable numerical values indicated in formula (7) allows the natural oscillation frequency region of the support section 30 and the resonance frequency region of the acceleration detection beam 3 to be located at different locations. The thickness of the acceleration detection beam 3 cannot be freely changed because this affects sensitivity and other characteristics. In addition, the quality of the acceleration detection beam 3 cannot be freely changed, without affecting the formation of a semiconductor thereon. Therefore, in such an embodiment, it is effective to change the natural oscillation frequency region of the support section by selecting the quality of the adhesive member. In the embodiment, although epoxy type resin having a smaller Young's modulus than gold silicide is used for the adhesive member, the adhesive layer can be made thicker by selecting an adhesive with higher viscosity, and thereby reducing the natural oscillation frequency of mechanical support section 30. It is to be noted that the frequency component needs to be less than 500 Hz for the semiconductor acceleration sensor to function satisfactorily as a sensor. No problems occur when the natural oscillation frequency of the adhesion section is 3 kHz.

In the semiconductor acceleration sensor with such a construction, the beam section 3b has a resonance frequency region which does not overlap the natural oscillation frequency region of the support section, and, therefore, the support section 30 does not resonate therewith, so that the amplification of the flexing of the beam section 3b does not become large and break the beam section 3b, This permits a highly reliable semiconductor acceleration sensor to be obtained.

The semiconductor acceleration sensor of one aspect of the present invention comprises a circuit substrate, a beam support provided on the circuit substrate, a flexible acceleration detection beam which deflects in accordance with the acceleration, an adhesive layer formed between the beam support and the acceleration detection beam, and a sensor element provided on the acceleration detection beam for converting the deflection amount of the acceleration detection beam to an electrical signal, wherein the natural oscillation frequency region of the support section, formed by the adhesive layer and a root section which is fixed to the adhesive layer for the acceleration detection beam, and the resonance frequency region of the beam section extending from the root section do not overlap. Therefore, the beam section and the support section do not resonate, so that the amplification of the oscillation of the beam section does not become large and break the beam section. This allows a highly reliable semiconductor acceleration sensor to be obtained.

In the semiconductor acceleration sensor of the aforementioned one form of the present invention, selection of the adhesive makes it possible to prevent overlap of the natural oscillation frequency region of the support section and the resonance frequency region of the beam section, thus providing an easy way to prevent overlap, without the necessity of changing the shape and quality of the beam section.

In the semiconductor acceleration sensor of the aforementioned one form of the present invention, an epoxy type resin is used as an adhesive, which provides an easy way to prevent overlap, without the necessity of changing the form and quality of the beam section.

In the semiconductor acceleration sensor of the aforementioned one form of the present invention, selection of the thickness of the adhesive layer makes it possible to prevent overlap of the natural oscillation frequency region of the support section with the resonance frequency region of the beam section, thus providing an easy way to prevent overlap, without the necessity of changing the form and quality of the beam section.

What is claimed is:

1. A semiconductor acceleration sensor comprising:

a circuit substrate;

a beam support provided on said circuit substrate;

a flexible acceleration detection beam that deflects in response to acceleration;

an adhesive between and bonding said beam support to said acceleration detection beam; and a sensor element on said acceleration detection beam for converting deflection of said acceleration detection beam into an electrical signal wherein a support section including said adhesive and a root section of said acceleration detection beam, fixed by said adhesive to said support section, has a natural oscillation frequency, and a section of said acceleration detection beam extending from said root section has a resonance frequency range that does not include the natural oscillation frequency.

2. The semiconductor acceleration sensor according to claim 1 wherein said adhesive is an epoxy resin.

3. A semiconductor acceleration sensor comprising:

a circuit substrate;

a beam support provided on said circuit substrate;

a flexible acceleration detection beam that deflects in response to acceleration;

an adhesive between and bonding said beam support to said acceleration detection beam: and a sensor element on said acceleration detection beam for converting deflection of said acceleration detection beam into an electrical signal wherein a support section including said adhesive and a root section of said acceleration detection beam, fixed by said adhesive to said support section, has a natural oscillation frequency, and a section of said acceleration detection beam extending from said root section has a resonance frequency range that does not include the natural oscillation frequency, said adhesive having a thickness selected to prevent inclusion in the resonance frequency range of the natural oscillation frequency of said support section.

4. The semiconductor acceleration sensor according to claim 3 wherein said adhesive is an epoxy resin.

* * * * *